United States Patent
Neugschwandtner et al.

(10) Patent No.: US 11,972,010 B2
(45) Date of Patent: Apr. 30, 2024

(54) SECURELY CONNECTING ISOLATED MANAGED HEAPS

(71) Applicant: Oracle International Corporation, Redwood Shores, CA (US)

(72) Inventors: Matthias Neugschwandtner, Perchtoldsdorf (AT); Christian Humer, Zurich (CH); Jakub Chaloupka, Brno (CZ)

(73) Assignee: Oracle International Corporation

( * ) Notice: Subject to any disclaimer, the term of this patent is extended or adjusted under 35 U.S.C. 154(b) by 463 days.

(21) Appl. No.: 17/387,640

(22) Filed: Jul. 28, 2021

(65) Prior Publication Data

US 2023/0035045 A1 Feb. 2, 2023

(51) Int. Cl.
*G06F 21/62* (2013.01)
*G06F 9/448* (2018.01)
*G06F 12/02* (2006.01)

(52) U.S. Cl.
CPC .......... *G06F 21/6227* (2013.01); *G06F 9/449* (2018.02); *G06F 12/0238* (2013.01); *G06F 12/0253* (2013.01)

(58) Field of Classification Search
None
See application file for complete search history.

(56) References Cited

U.S. PATENT DOCUMENTS

| | | | |
|---|---|---|---|
| 2008/0021939 A1* | 1/2008 | Dahlstedt | G06F 12/0253 |
| 2018/0260564 A1* | 9/2018 | Porteboeuf | G06F 21/54 |
| 2021/0232511 A1* | 7/2021 | Boettcher | G06F 12/0253 |

\* cited by examiner

*Primary Examiner* — Craig C Dorais
(74) *Attorney, Agent, or Firm* — Lathrop GPM LLP (57) ABSTRACT

A method may include generating, by a source isolate, an external object reference, passing, by the source isolate, the external object reference to a target isolate, storing, by the source isolate and in an exported reference table, an entry that maps the external object reference to an object stored in a heap of the source isolate, performing, by the target isolate, a task that accesses the object using the external object reference, receiving, by the source isolate and from a finalizer of the external object reference, a notification that the external object reference has become unreferenced, and in response to the notification, removing, by the source isolate, the entry from the exported reference table.

20 Claims, 7 Drawing Sheets

SECURELY CONNECTING ISOLATED MANAGED HEAPS

BACKGROUND

Security may be enhanced through isolation of distrusting components of an application, for example, by limiting resources shared between the distrusting components. The application may execute in a managed runtime, such as the Java Virtual Machine (JVM). However, if components maintain their runtime state on separate heaps, data exchange via simple passing of objects may become cumbersome. For example, simply copying data from one heap to another may require a traversal of the entire object hierarchy, potentially copying much more data than needed, thus introducing unnecessary overhead. The process of (un)marshaling complex objects may contribute to additional overhead and security concerns. In addition, in managed runtimes, a garbage collector of a computing system decides when unreferenced data may be freed. The garbage collector's task becomes complicated when external references are involved.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating, by a source isolate, an external object reference, passing, by the source isolate, the external object reference to a target isolate, storing, by the source isolate and in an exported reference table, an entry that maps the external object reference to an object stored in a heap of the source isolate, performing, by the target isolate, a task that accesses the object using the external object reference, receiving, by the source isolate and from a finalizer of the external object reference, a notification that the external object reference has become unreferenced, and in response to the notification, removing, by the source isolate, the entry from the exported reference table.

In general, in one aspect, one or more embodiments relate to a system including a computer processor, a process executing on the computer processor and including isolates including (i) a source isolate including a heap and an exported reference table, and (ii) a target isolate. The heap stores an object. The source isolate is configured to generate an external object reference, pass the external object reference to the target isolate, store, in the exported reference table, an entry that maps the external object reference to the object, receive, from a finalizer of the external object reference, a notification that the external object reference has become unreferenced, and in response to the notification, remove the entry from the exported reference table. The target isolate is configured to perform a task that accesses the object using the external object reference.

In general, in one aspect, one or more embodiments relate to a non-transitory computer readable medium including instructions that, when executed by a computer processor, perform: generating, by a source isolate, an external object reference, passing, by the source isolate, the external object reference to a target isolate, storing, by the source isolate and in an exported reference table, an entry that maps the external object reference to an object stored in a heap of the source isolate, performing, by the target isolate, a task that accesses the object using the external object reference, receiving, by the source isolate and from a finalizer of the external object reference, a notification that the external object reference has become unreferenced, and in response to the notification, removing, by the source isolate, the entry from the exported reference table.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention are directed to data exchange between heaps in different isolates. Isolates are distinct runtime execution contexts for a software application. The software application may be a multi-tenant application that includes multiple application instances sharing an address space. For example, the multiple application instances may include a privileged host application instance and one or more less-privileged guest application instances. An exported reference table of a source isolate tracks which objects of the source isolate are exposed, via external object references, to target isolates. The target isolate may perform a task that accesses the object using the external object reference. The exported reference table maps external object references to object identifiers (IDs).

The source isolate may receive, from the target isolate, a notification that the external object reference has become unreferenced from a finalizer of the external object reference, at which point the source isolate may remove the external object reference from the exported reference table.

The finalizer may be notified by a local garbage collector of the target isolate. The use of finalizers is common among garbage collectors, thus the invention makes no limiting assumptions regarding garbage collector implementation. For example, one advantage of the invention is that a distributed garbage collector is not required.

External object references may form cycles. Such external object reference cycles may prevent the referenced objects from being garbage collected because the external object reference cycles may be undetected by local garbage collectors. A variety of mechanisms may be used to address the problem of external object reference cycles. An external object reference cycle occurs when an object $O_{1A}$ in isolate $I_A$ includes an external object reference B that is mapped to an object $O_{1B}$ in isolate $I_B$, where object $O_{1B}$ includes an external object reference A that is mapped to object $O_{1A}$. Different programming model options indicate how external object references are managed. For example, a programming model option may prevent the formation of external object reference cycles by preventing the generation of an external object reference when the source isolate fails to precede the target isolate in a total order of the isolates. As another example, a programming model option may indicate that the scope (e.g., the validity) of an external object reference that is passed to a function is restricted to the scope of the function. As yet another example, a programming model option may indicate that an external object reference designated as "strong" remains valid until the target isolate requests that the external object reference be deallocated.

Figure 1A:
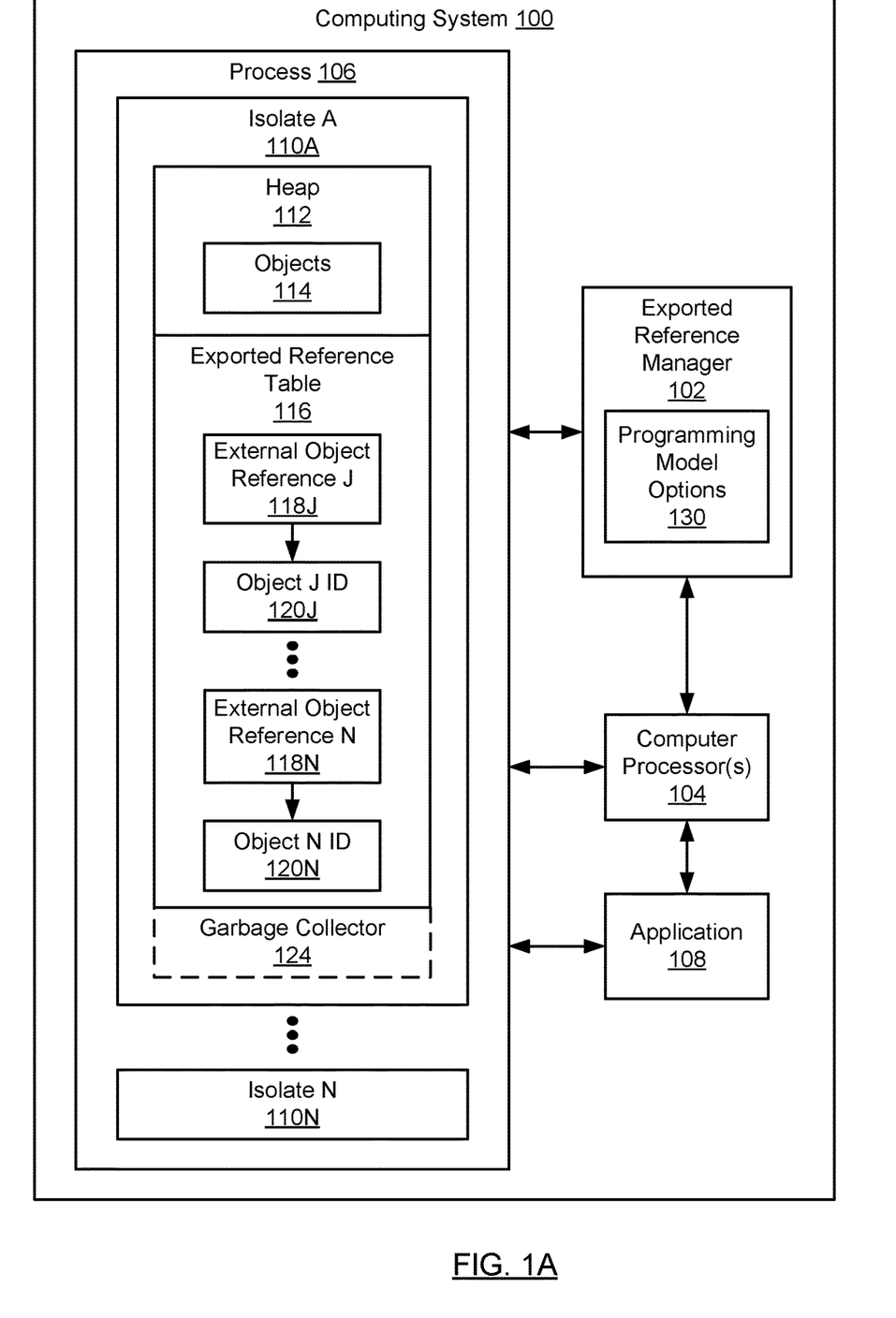
FIG. 1A and FIG. 1B show a system in accordance with one or more embodiments of the invention.

FIG. 1A shows a computing system (100) in accordance with one or more embodiments of the invention. In one or more embodiments, the computing system (100) takes the form of the computing system (500) described with respect to FIG. 5A and the accompanying description below, or takes the form of the client device (526) described with respect to FIG. 5B. The computing system (100) includes an exported reference manager (102), computer processor(s) (104), a process (106), and an application (108).

The application (108) is a collection of source code including various software components. The application (108) may include a collection of computer instructions written in a programming language, or intermediate representation (e.g., byte code). In one or more embodiments, the collection of computer instructions may construct and/or reference various objects. The application (108) may include one or more entry points where the application (108) may be invoked by software external to the application (108). Examples of entry points include any function, procedure, or method exposed via an application programming interface (API).

The application (108) may be a multi-tenant application that includes multiple application instances sharing an address space. For example, the multiple application instances may include a privileged host application instance and one or more less-privileged guest application instances. The multiple application instances may execute in the process (106).

In one or more embodiments, the process (106) is a language virtual machine. A language virtual machine may provide a platform-independent programming environment that abstracts away details of the underlying computing system (100). For example, the language virtual machine may allow the application (108) to execute in the same way on any computing platform. In one or more embodiments, the process (106) includes isolates (110A, 110N). The isolates (110A, 110N) may be stored in a memory of the computing system (100). For example, the memory may be associated with persistent storage (506) and/or non-persistent storage (504) of the computing system (500) of FIG. 5A.

An isolate (110A) is a distinct runtime execution context for the application (108). In one or more embodiments, the execution contexts are isolated based on an isolation criterion. For example, the isolation criterion may be based on identity, where each isolate (110A, 110N) corresponds to a different user of the application (108). Alternatively, the isolation criterion may be based on a type of task. For example, one isolate may correspond to creating and/or modifying data in the application (108), while another isolate may correspond to analyzing data in the application (108).

In one or more embodiments, an isolate (110A) includes a heap (112), an exported reference table (116), and, optionally, a garbage collector (124). An isolate (110A) may include functionality to perform its own heap management, garbage collection, and/or various other runtime services. For example, the attack surface of the application (108) may be reduced because each isolate (110A, 110N) manages its own heap (112). Continuing this example, a software component that consumes an excessive amount of memory may affect the heap and/or garbage collector in the isolate that includes the software component without affecting the heaps and/or garbage collectors of other isolates.

The heap (112) may be an area of memory used for memory allocation, such that blocks of memory may be allocated and freed in an arbitrary order. The heap (112) may include functionality to store objects (114). For example, the heap (112) may store objects (114) (e.g., arrays) dynamically allocated by the application (108). The heap (112) may include objects that are private with respect to a specific isolate (110A), and are thus inaccessible by other isolates.

The exported reference table (116) of an isolate (e.g., isolate A (110A)) tracks which objects of the isolate are exported (e.g., exposed) to other isolates. The exported reference table (116) includes entries that map external object references (118J, 118N) to object identifiers (IDs) (120J, 120N). An external object reference (118J) may be a unique identifier. An object ID (120J) may be a name of an object (114), a unique identifier of an object (114), a pointer to an object (114), etc. The external object reference (118J) may be exported from an isolate to one or more other isolates which may access the object (114) using the external object reference (118J). The isolate that exports the external object reference (118J) is referred to as a source isolate, and the isolate that imports (e.g., receives) the external object reference (118J) is referred to as a target isolate. The source isolate may export the external object reference (118J) to the target isolate in response to a request from the target isolate to access an object stored in the heap (112) of the source isolate.

Figure 1B:
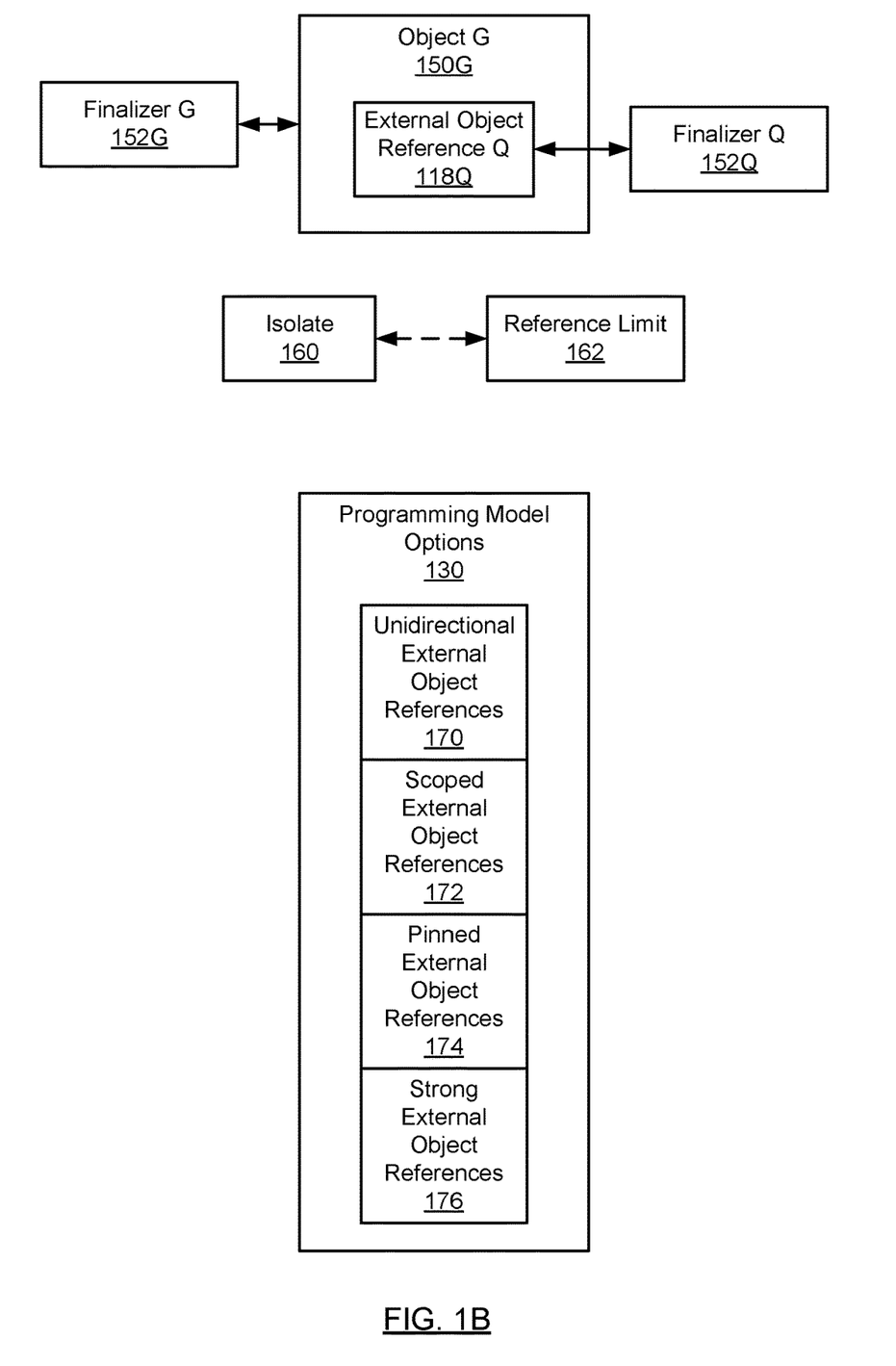
Figure 4A:
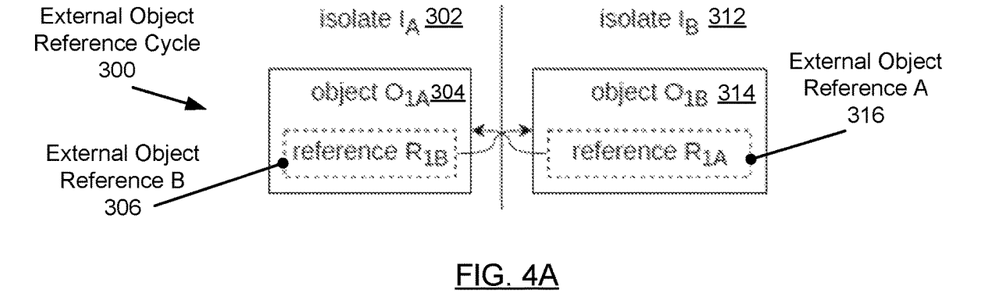
FIG. 4A, FIG. 4B, FIG. 4C, and FIG. 4D show examples in accordance with one or more embodiments of the invention.

Turning to FIG. 1B, an object G (150G) may include an external object reference (118Q). The external object reference (118Q) may reference an object P stored in a heap of a "source" isolate different from the "target" isolate whose heap includes object G (150G). For example, FIG. 4A shows an object $O_{1A}$ (304) in isolate $I_A$ (302) that includes an external object reference B (306) to an object $O_{1B}$ (314) in isolate $I_B$ (312). FIG. 4A also shows that object $O_{1B}$ (314) in isolate $I_B$ (312) includes an external object reference A (316) to object $O_{1A}$ (304) in isolate $I_A$ (302).

Returning to FIG. 1A, the garbage collector (124) is a software component that includes functionality to decide when an object (114) has become unreferenced, and thus may be garbage collected. The object (114) has become unreferenced when there are no longer any references to the object (114). The process of garbage collection includes deallocating (e.g., freeing) the memory allocated to the object (114) from the heap (112). Each isolate may include a garbage collector (124). When a garbage collector (124) is included in each isolate, then the ability of the garbage collector (124) to detect unreferenced objects may be limited to objects that become unreferenced locally within the isolate that includes the garbage collector (124). Because an isolate-specific garbage collector lacks access to the semantics of the exported reference table (116) (e.g., which objects are exported between different isolates), a finalizer may be used to determine when to remove an external object reference (118J) from the exported reference table (116) of the source isolate.

Returning to FIG. 1B, an object G (150G) may correspond to a finalizer (152G). Similarly, an object that is an external object reference (118Q) may correspond to a finalizer (152Q). A finalizer (152G) is a software component that is invoked when an object (e.g., object G (150G) or external object reference (118Q)) is identified for garbage collection, and before the memory on the heap (112) allocated to the object is deallocated. In FIG. 1B, the external reference object (118Q) may be identified for garbage collection after object G (150G) has been identified for garbage collection, because object G (150G) includes a reference to the external reference object (118Q). The finalizer (152Q) for an object that is an external object reference may be modified to notify the source isolate that the external object reference has become unreferenced, and thus the source isolate may remove the external object reference from the exported reference table (116) of the source isolate. For example, the external object reference may become unreferenced when the target isolate no longer references the external object reference. Continuing this example, when the garbage collector of the target isolate identifies the unreferenced external object reference as garbage to be collected, the finalizer (152Q) for the external object reference may notify the source isolate that the external object reference has become unreferenced, and thus the source isolate should remove the external object reference from the exported reference table (116) of the source isolate. Because the finalizer may not retain a reference to the object to be garbage collected (e.g., in this case, the external object reference), the object may not be resurrected during finalization. Preventing object resurrection improves compatibility with conventional garbage collectors, which often do not support object resurrection.

When a garbage collector (124) is included in each isolate, a variety of mechanisms may be used to address the problem of external object reference cycles (see discussion of FIG. 3 below). As shown in FIG. 4A, an external object reference cycle (300) occurs when an object $O_{1A}$ (304) in isolate $I_A$ (302) includes an external object reference B (306) that is mapped to an object $O_{1B}$ (314) in isolate $I_B$ (312), and object $O_{1B}$ (314) includes an external object reference A (316) that is mapped to object $O_{1A}$ (304).

Continuing with FIG. 1B, an isolate (160) may optionally correspond to a reference limit (162). The reference limit (162) may be used to restrict the generation of external object references for security and/or performance reasons. For example, a source isolate may export an external object reference to a target isolate when the number of external object references included in the exported reference table (116) of the source isolate is less than the reference limit (162) of the source isolate. Continuing this example, when the reference limit (162) is reached, the source isolate may not generate any new external object references until the requesting target isolate releases one or more external object references included in the exported reference table (116) of the source isolate. Further continuing this example, the target isolate may release such external object references by triggering garbage collection in the target isolate in order to deallocate stale external object references that are no longer used by the target isolate so that the stale external object references may be removed from the exported reference table (116) of the source isolate. Restricting the generation of external object references may help defend against attack scenarios. For example, one such attack scenario occurs when a malicious actor (e.g., a malicious target isolate) attempts to cause the proliferation of external object references by a source isolate through callbacks to the source isolate, resulting in excessive memory consumption by the source isolate due to an overpopulated exported reference table (116), in addition to decreasing the performance of the source isolate by overloading the garbage collector of the source isolate.

The use of reference limits may be enhanced by associating a weight with each external object reference, where the weight is based on a type or property of an object referenced by the external object reference, and where the reference limit (162) of the source isolate is compared to the sum of the weights associated with the external object references included in the exported reference table (116) of the source isolate. For example, the weight may be proportional to the size of the object in memory, in order to provide a measure of the resources associated with the external object reference at the source isolate. Continuing this example, when the sum of the weights of the external object references included in exported reference table (116) of the source isolate reaches the reference limit (162), the source isolate may not export any new external object references until one or more external object references included in the exported reference table (116) of the source isolate are deallocated.

In one or more embodiments, the exported reference manager (102) may be implemented in hardware, software, firmware, and/or any combination thereof. In one or more embodiments, the exported reference manager (102) includes functionality to manage the generation and/or scoping of external object references (118J, 118N) using the exported reference table (116) and one or more programming model options (130). A programming model option (130) indicates how external object references are managed. For example, a programming model option (130) may indicate unidirectional external object references (170) in order to prevent external object reference cycles. For example, external object reference cycles may be prevented by obtaining a total order on the isolates (110A, 110N) and preventing the generation of an external object reference when the source isolate fails to precede the target isolate in the total order. External object references may form a directed graph among isolates (110A, 110N), where the vertices of the directed graph are the isolates (110A, 110N) and the edges of the directed graph are external object references. External object reference cycles may be prevented by disallowing external object references between certain isolates in a specific direction such that the allowed external object references form an acyclic graph among the isolates (110A, 110N). Selecting a total order of the isolates (110A, 110N) is one way to form an acyclic graph among the isolates (110A, 110N). Selecting a total order of the isolates (110A, 110N) may be suited for applications where the data flow between pairs of isolates is unevenly distributed.

As another example, a programming model option (130) may indicate scoped external object references (172) where the scope (e.g., the validity) of an external object reference that is passed to a function is restricted to the scope of the function. If scoped external object references form an external object reference cycle, then the external object reference cycle may be broken when the function terminates. As yet another example, a programming model option (130) may indicate pinned external object references (174) where the scope of an external object reference designated (e.g., by the application (108)) as "pinned" that is passed to a function extends beyond the scope of the function. If pinned external object references form an external object reference cycle, then the external object reference cycle may be broken when the external object reference cycle is designated as "unpinned". As yet another example, a programming model option (130) may indicate strong external object references (176) where an external object reference designated as "strong" remains valid (e.g., the external object reference persists in the exported reference table) until the target isolate requests that the external object reference be deallocated. If strong external object references form an external object reference cycle, then the external object reference cycle may be broken by a request (e.g., from the target isolate) to deallocate the external object reference cycle.

As a non-limiting example, programming model options (130) have been implemented in the Graal Virtual Machine (GraalVM) in the context of the Truffle framework, which supports a host application instance and multiple guest application instances in a multi-tenant application scenario. GraalVM supports explicit references to objects in a guest application instance with a type that is observable by a software developer. GraalVM also supports implicit references that are transparent to the software developer. GraalVM further supports a reference to a global scope of a guest application instance.

In the GraalVM implementation of programming model options (130), the following are strong external object references: 1) explicit external object references to guest objects, such as the reference to the global scope of the guest application instance; and 2) external object references to host objects added to the global scope of a guest application instance. In addition, external object references to host objects passed as arguments to a function invoked in an isolate of a guest application instance are either: 1) strong external object references; or 2) scoped external object references scoped to the function invoked in the isolate of the guest application instance. Furthermore, external object references to guest objects during callbacks to the host are scoped external object references, where the scope is the scope of the callback. If the external object references are required beyond the scope of the callback, the external object references may be designated as "pinned" by the host. Alternatively, external object references to guest objects during callbacks to the host may be prohibited using unidirectional external object references, for example, where the generation of an external object reference is conditional on the host preceding the guest in a total order of isolates.

Figure 2:
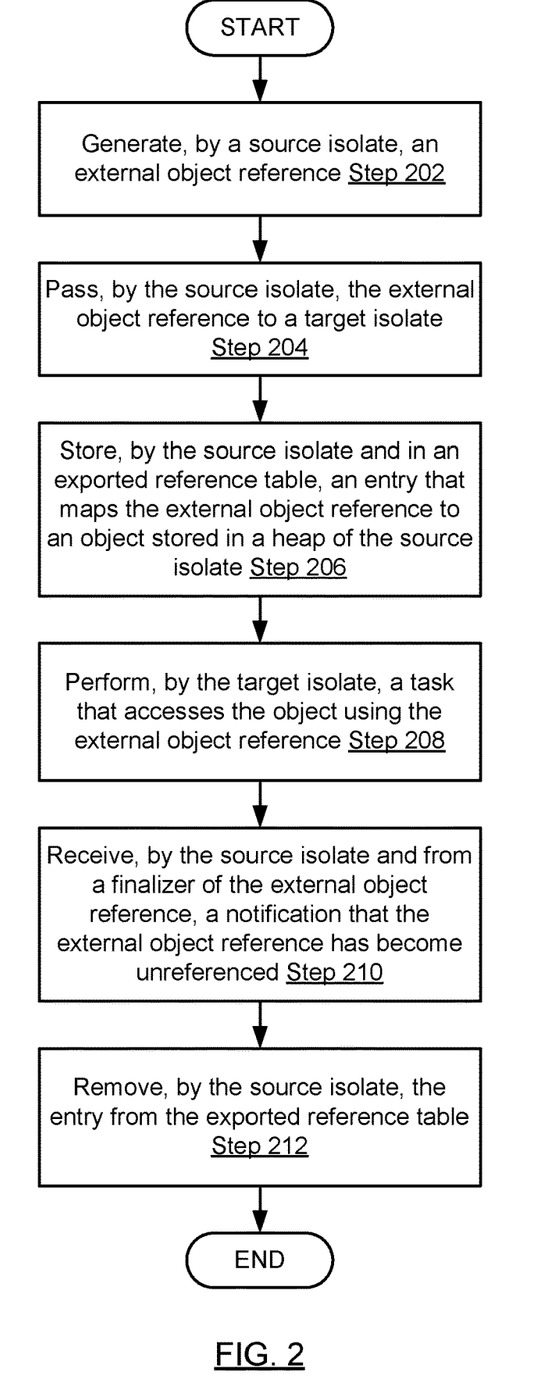
FIG. 2 and FIG. 3 show flowcharts in accordance with one or more embodiments of the invention.

FIG. 2 shows a flowchart in accordance with one or more embodiments of the invention. The flowchart depicts a process for securely connecting isolated heaps. One or more of the steps in FIG. 2 may be performed by the components (e.g., the isolates (110A, 110N) and the exported reference manager (102) of the computing system (100), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, an external object reference is generated by a source isolate. The source isolate may generate the external object reference in response to receiving, from a target isolate, a request to access an object stored in a heap of the source isolate.

The source isolate may use a reference limit to restrict the generation of external object references. For example, the source isolate may generate the external object reference when the number of external object references included in the exported reference table of the source isolate is less than the reference limit of the source isolate. Continuing this example, when the reference limit is reached, the source isolate may not generate any new external object references until the requesting target isolate releases one or more external object references included in the exported reference table of the source isolate.

As another example, the source isolate may generate the external object reference when the sum of the weights of the external object references included in the exported reference table of the source isolate is less than the reference limit of the source isolate.

In Step 204, the external object reference is passed by the source isolate to the target isolate. For example, the source isolate may pass the external object reference as a parameter to a function invoked in the target isolate. Continuing this example, a programming model option may be used to determine the scope the external object reference, as described in Step 262, Step 264, Step 266, and Step 268 below.

In Step 206, an entry that maps the external object reference to the object in the heap of the source isolate is stored in an exported reference table by the source isolate. The entry may map the external object reference to an object identifier (ID) of the object. The exported reference table tracks the external object references exported by the source isolate.

In Step 208, a task that accesses the object using the external object reference is performed by the target isolate. For example, the external object reference may be dynamically typed and the task may be forwarding a query regarding a type or property of the external object reference to the object. As another example, the task may be storing the external object reference in an object stored in the heap of the target isolate.

In Step 210, a notification that the external object reference has become unreferenced is received from the target isolate by the source isolate from a finalizer of the external object reference. The finalizer of the external object reference may be modified to send the notification that the external object reference has become unreferenced. The use of finalizers is common among garbage collectors, thus no limiting assumptions are made regarding garbage collector implementation. Thus, the process described by FIG. 2 applies to scenarios where isolates use different garbage collector implementations and/or different runtimes.

In Step 212, the entry is removed from the exported reference table by the source isolate. For example, the source isolate may query the exported reference table to identify, and then delete the entry whose external object reference matches the external object reference generated in Step 202 above.

Figure 3:
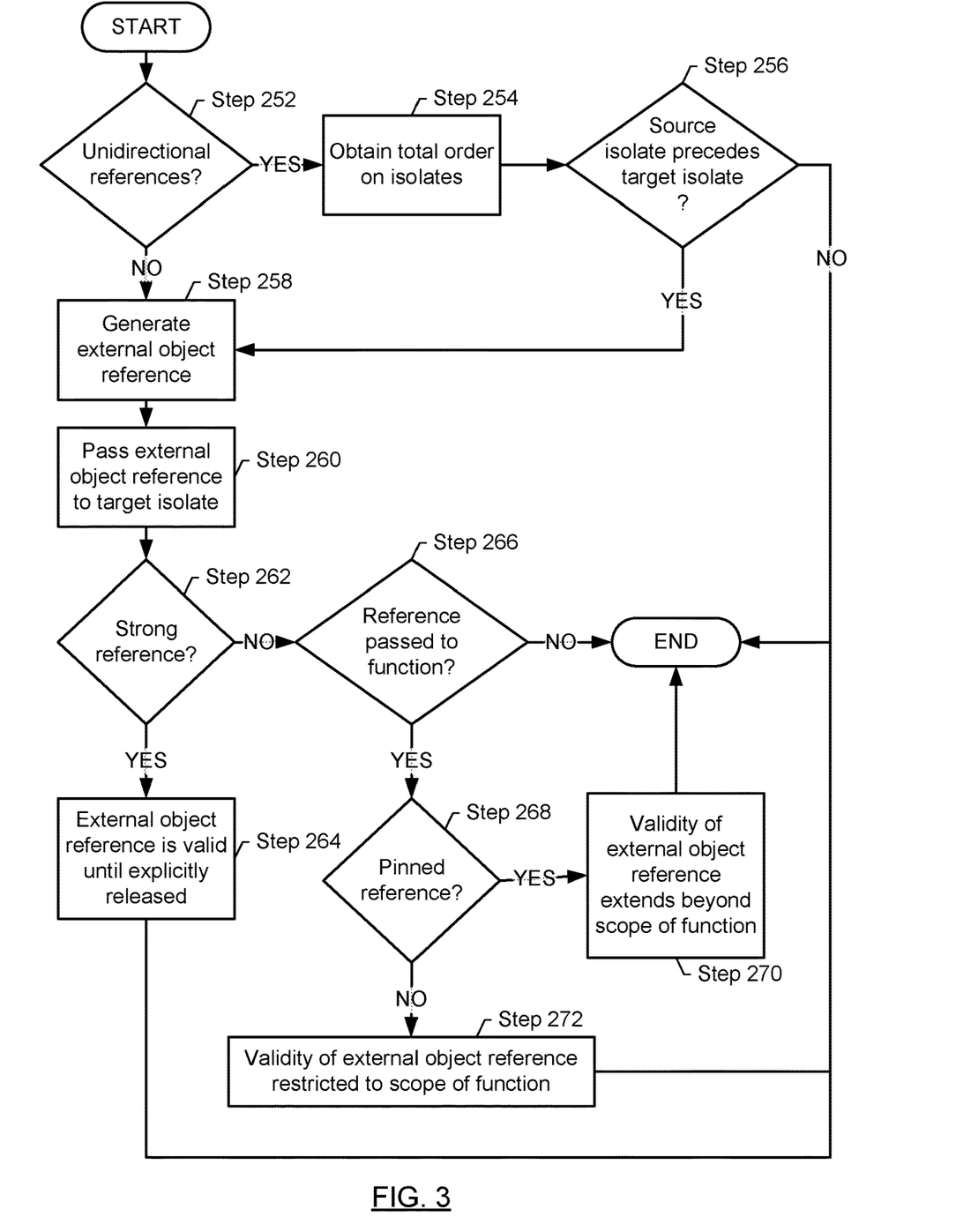

FIG. 3 shows a flowchart in accordance with one or more embodiments of the invention. The flowchart depicts a process for securely connecting isolated heaps. One or more of the steps in FIG. 3 may be performed by the components (e.g., the isolates (110A, 110N) and the exported reference manager (102) of the computing system (100), discussed above in reference to FIG. 1A). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 252, if it is determined that external object references are unidirectional, then in Step 254, a total order on the isolates is obtained. The exported reference manager may determine that external object references are unidirectional (e.g., to prevent external object reference cycles) when a programming model option indicates unidirectional external object references.

If, in Step 256, if it is determined that the source isolate precedes the target isolate in the total order, then in Step 258, the external object reference is generated (see description of Step 202 above).

In Step 260, the external object reference is passed by the source isolate to a target isolate (see description of Step 204 above).

In Step 262, if it is determined that the external object reference is a strong reference, then in Step 264 the external object reference remains valid until the target isolate sends a request, to the source isolate, to deallocate the external object reference (e.g., because the strong reference is uncollectable by a garbage collector). The source isolate may remove the external object reference from the exported reference table in response to receiving the request to deallocate the external object reference.

Otherwise, if Step 262 determines that that the external object reference is not a strong reference, then, in Step 266, if it is determined that the external object reference is passed to a function invoked in the target isolate, then Step 268 below is performed. Otherwise, if Step 266 determines that that the external object reference is not passed to a function invoked in the target isolate, then the scope of the external object reference is undefined (e.g., undefined relative to the programming model options of the source isolate).

In Step 268, if it is determined that the external object reference is a pinned reference, then in Step 270 the scope of the external object reference extends beyond the scope of the function invoked in the target isolate. Otherwise, if Step 268 determines that that the external object reference is not a pinned reference, then in Step 272 the scope of the external object reference is restricted to the scope of the function invoked in the target isolate (e.g., the external object reference is deallocated after the function invoked in the target isolate terminates).

The following example is for explanatory purposes only and not intended to limit the scope of the invention.

FIG. 4A, FIG. 4B, FIG. 4C, and FIG. 4D show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

FIG. 4A shows an external object reference cycle (300) that includes object $O_{1A}$ (304) ((114) in FIG. 1A and (150G) in FIG. 1B) in isolate $I_A$ (302) ((110A, 110N) in FIG. 1A and (160) in FIG. 1B). Object $O_{1A}$ (304) includes an external object reference B (306) ((118J, 118N) in FIG. 1A and (118Q) in FIG. 1B) to an object $O_{1B}$ (314) in isolate $I_B$ (312). FIG. 4A further shows that object $O_{1B}$ (314) in isolate $I_B$ (312) includes an external object reference A (316) to object $O_{1A}$ (304) in isolate $I_A$ (302). The external object reference cycle (300) is not detectable by a garbage collector that is specific to either isolate $I_A$ (302) or isolate $I_B$ (312).

Figure 4B:
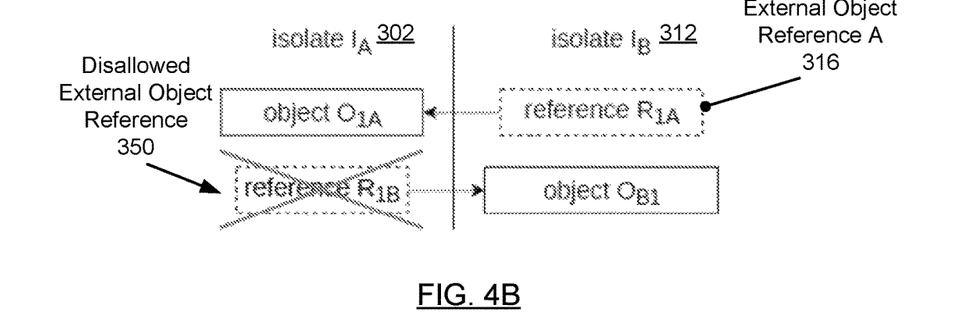

The external object reference cycle (300) may be prevented by implementing the programming model option "unidirectional external object references," as shown in FIG. 4B. FIG. 4B shows a disallowed external object reference (350) due to the "source" isolate $I_B$ (312) for the disallowed external object reference (350) failing to precede, in a total order of isolates, the "target" isolate $I_A$ (302) for the disallowed external object reference (350). Although the total order restricts the direction of external object references, the total order does not restrict the direction of data exchange. For example, the "source" isolate $I_B$ (312) may still send data to the "target" isolate $I_A$ (302) by manipulating external object reference A (316).

Figure 4C:
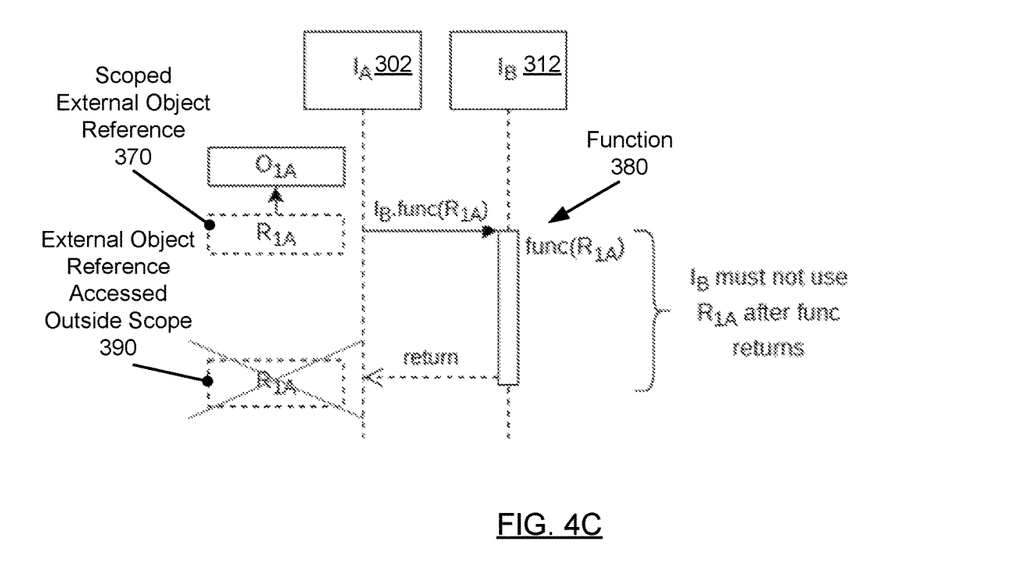

FIG. 4C shows a scoped external object reference (370) generated by isolate $I_A$ (302) consistent with the programming model option "scoped external object references." Isolate $I_A$ (302) passes the scoped external object reference (370) to a function (380) invoked in isolate $I_B$ (312). The validity of scoped external object reference (370) is restricted to the execution of the function (380). Thus, when the external object reference is accessed outside its scope (390) (i.e., after the function (380) returns), an exception is raised. If the scoped external object reference (370) becomes part of an external object reference cycle, then the external object reference cycle may be broken when the function (380) terminates.

Figure 4D:
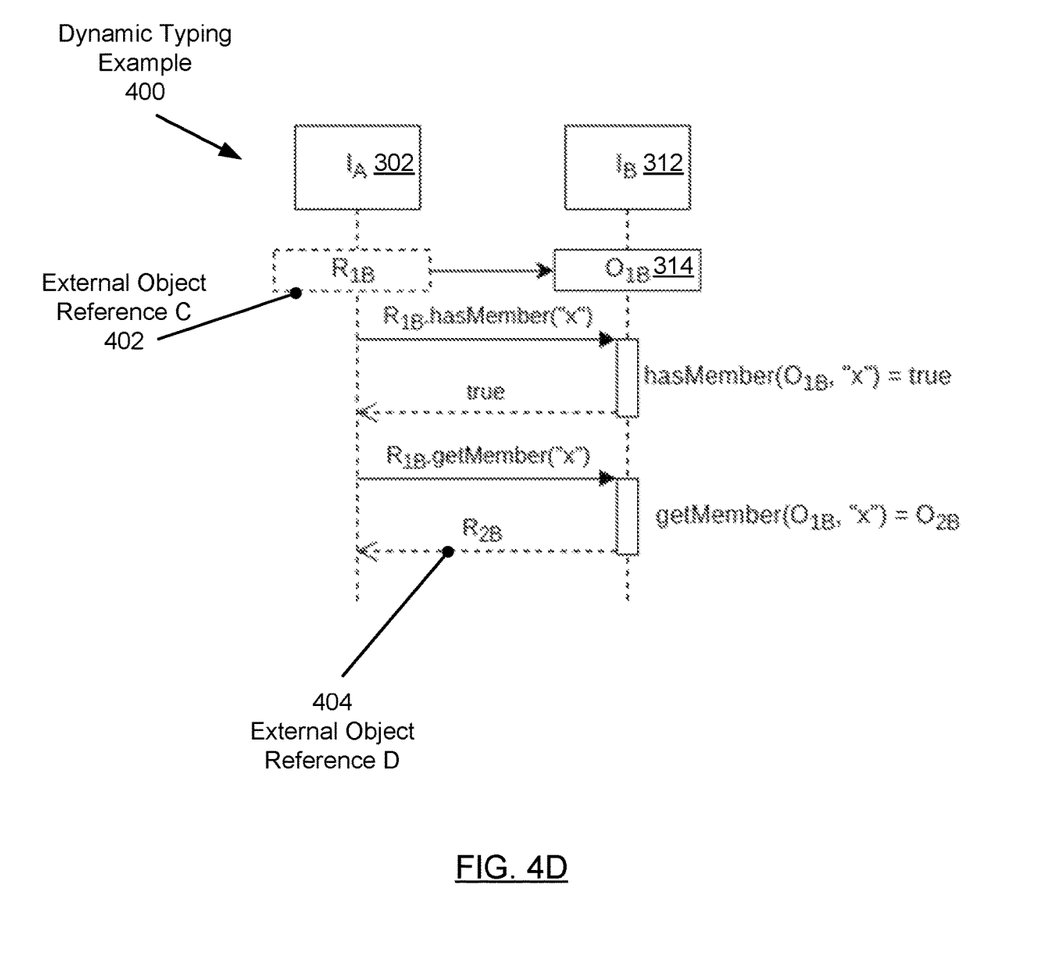

FIG. 4D shows a dynamically typing example (400) in which an external object reference C (402) to object $O_{1B}$ (314) in isolate $I_B$ (312) is generated by isolate $I_B$ (312) and passed to isolate $I_A$ (302). Isolate $I_A$ (302) may query object $O_{1B}$ (314) using external object reference C (402) to discover whether object $O_{1B}$ (314) has members (e.g., properties, functions, etc.). For example, the "hasMembers" function returns true if object $O_{1B}$ (314) has members such as object fields or methods. Upon isolate $I_A$ (302) discovering that object $O_{1B}$ (314) has members, isolate $I_A$ (302) may query object $O_{1B}$ (314) using external object reference C (402) to get the members of object $O_{1B}$ (314). The return value of the "getMember" function depends on the type of the member: if the member is a primitive value, then the primitive value is returned. If the member is an object, then a new external object reference D (404) is returned.

Figure 5A:
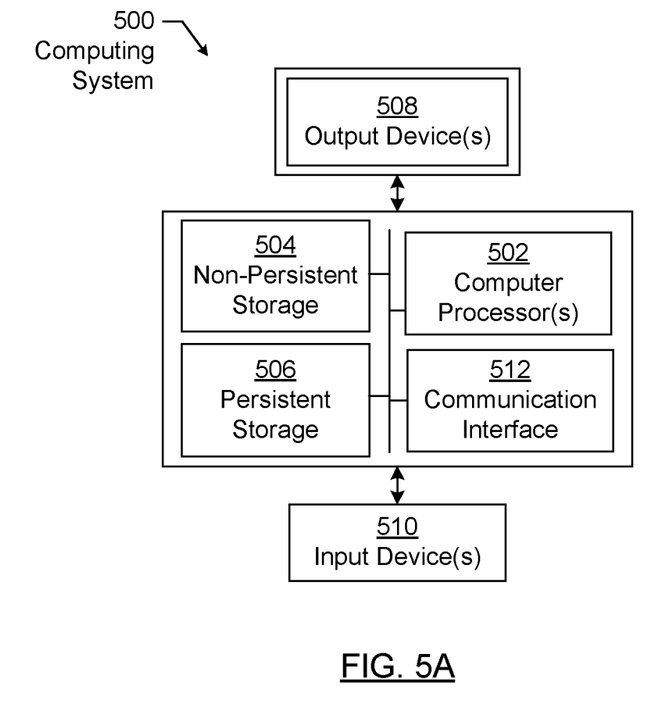
FIG. 5A and FIG. 5B show computing systems in accordance with one or more embodiments of the invention.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
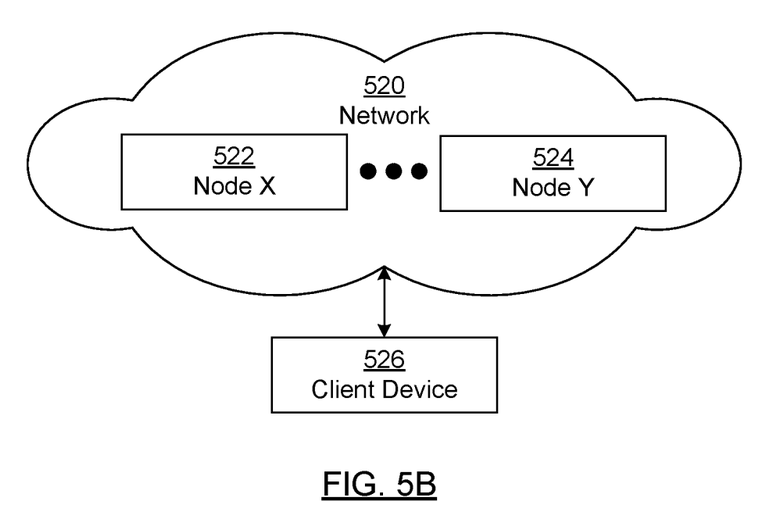

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
generating, by a source isolate of a plurality of isolates, an external object reference;
passing, by the source isolate, the external object reference to a target isolate of the plurality of isolates;
storing, by the source isolate and in an exported reference table, an entry that maps the external object reference to an object stored in a heap of the source isolate;
performing, by the target isolate, a task that accesses the object using the external object reference;
receiving, by the source isolate and from a finalizer of the external object reference, a notification that the external object reference has become unreferenced; and
in response to the notification, removing, by the source isolate, the entry from the exported reference table.

2. The method of claim 1, further comprising:
receiving, by the source isolate and from the target isolate, a request to access the object,
wherein the source isolate generates the external object reference in response to receiving the request.

3. The method of claim 1, further comprising:
obtaining a total order of the plurality of isolates; and
determining that the source isolate precedes the target isolate in the total order,
wherein the source isolate generates the external object reference in response to determining that the source isolate precedes the target isolate in the total order.

4. The method of claim 1, wherein the source isolate passes the external object reference to a function invoked in the target isolate, the method further comprising:
determining that a scope of the external object reference is restricted to a scope of the function.

5. The method of claim 1, wherein the source isolate passes the external object reference to a function invoked in the target isolate, the method further comprising:
determining that the external object reference is pinned; and
in response to determining that the external object reference is pinned, determining that a scope of the external object reference extends beyond a scope of the function.

6. The method of claim 1, further comprising:
determining that the external object reference is a strong reference that remains valid until the target isolate sends a request, to the source isolate, to deallocate the external object reference.

7. The method of claim 1, wherein the source isolate comprises a reference limit and a plurality of external object references, and wherein the plurality of external object references comprise the external object reference, the method further comprising:
determining, by the source isolate, that the reference limit exceeds a count of the plurality of external object references,
wherein the source isolate generates the external object reference in response to determining that the reference limit exceeds the count of the plurality of external object references.

8. The method of claim 1, wherein the source isolate comprises a reference limit and a plurality of external object references, wherein the plurality of external object references comprise the external object reference, and wherein the plurality of external object references correspond to a plurality of weights each corresponding to an amount of resources of a computing system, the method further comprising:
determining, by the source isolate, that the reference limit exceeds a sum of the plurality of weights corresponding to the plurality of external object references,
wherein the source isolate generates the external object reference in response to determining that the reference limit exceeds the sum of the plurality of weights.

9. The method of claim 1, wherein the task is determining a property of the object by querying the object.

10. A system comprising:
a computer processor; and
a process executing on the computer processor and comprising a plurality of isolates comprising (i) a source isolate comprising a heap and an exported reference table, wherein the heap stores an object, and (ii) a target isolate,
wherein the source isolate is configured to:
generate an external object reference,
pass the external object reference to the target isolate,
store, in the exported reference table, an entry that maps the external object reference to the object, receive, from a finalizer of the external object reference, a notification that the external object reference has become unreferenced, and in response to the notification, remove the entry from the exported reference table, and wherein the target isolate is configured to perform a task that accesses the object using the external object reference.

11. The system of claim 10, wherein the source isolate is further configured to:

receive, from the target isolate, a request to access the object, wherein the source isolate generates the external object reference in response to receiving the request.

12. The system of claim 10, further comprising an exported reference manager executing on the computer processor and configured to:

obtain a total order of the plurality of isolates, and determine that the source isolate precedes the target isolate in the total order, wherein the source isolate generates the external object reference in response to determining that the source isolate precedes the target isolate in the total order.

13. The system of claim 10, further comprising an exported reference manager executing on the computer processor and configured to:

determine that a scope of the external object reference is restricted to a scope of a function invoked in the target isolate, wherein the source isolate is further configured to pass the external object reference to the function invoked in the target isolate.

14. The system of claim 10, further comprising an exported reference manager executing on the computer processor and configured to:

determine that the external object reference is pinned, and in response to determining that the external object reference is pinned, determine that a scope of the external object reference extends beyond a scope of a function invoked in the target isolate, wherein the source isolate is further configured to pass the external object reference to the function invoked in the target isolate.

15. The system of claim 10, wherein the source isolate is further configured to:

determine that the external object reference is a strong reference that remains valid until the target isolate sends a request, to the source isolate, to deallocate the external object reference.

16. The system of claim 10, wherein the source isolate comprises a reference limit and a plurality of external object references, wherein the plurality of external object references comprise the external object reference, and wherein the source isolate is further configured to:

determine that the reference limit exceeds a count of the plurality of external object references, wherein the source isolate generates the external object reference in response to determining that the reference limit exceeds the count of the plurality of external object references.

17. The system of claim 10, wherein the source isolate comprises a reference limit and a plurality of external object references, wherein the plurality of external object references comprise the external object reference, wherein the plurality of external object references comprise a plurality of weights each corresponding to an amount of resources of the system, and wherein the source isolate is further configured to:

determine that the reference limit exceeds a sum of the plurality of weights corresponding to the plurality of external object references, wherein the source isolate generates the external object reference in response to determining that the reference limit exceeds the sum of the plurality of weights.

18. The system of claim 10, wherein the target isolate is further configured to:

determine, using the external object reference, a property of the object by querying the object.

19. A non-transitory computer readable medium comprising instructions that, when executed by a computer processor, perform:

generating, by a source isolate of a plurality of isolates, an external object reference;

passing, by the source isolate, the external object reference to a target isolate of the plurality of isolates;

storing, by the source isolate and in an exported reference table, an entry that maps the external object reference to an object stored in a heap of the source isolate;

performing, by the target isolate, a task that accesses the object using the external object reference;

receiving, by the source isolate and from a finalizer of the external object reference, a notification that the external object reference has become unreferenced; and in response to the notification, removing, by the source isolate, the entry from the exported reference table.

20. The non-transitory computer readable medium of claim 19, wherein the instructions further perform:

obtaining a total order of the plurality of isolates; and determining that the source isolate precedes the target isolate in the total order, wherein the source isolate generates the external object reference in response to determining that the source isolate precedes the target isolate in the total order.

* * * * *

UNITED STATES PATENT AND TRADEMARK OFFICE
CERTIFICATE OF CORRECTION

PATENT NO. : 11,972,010 B2
APPLICATION NO. : 17/387640
DATED : April 30, 2024
INVENTOR(S) : Neugschwandtner et al.

Page 1 of 1

It is certified that error appears in the above-identified patent and that said Letters Patent is hereby corrected as shown below:

In the Specification

In Column 9, Line 32, delete "that that" and insert -- that --, therefor.

In Column 9, Lines 36-37, delete "that that" and insert -- that --, therefor.

In Column 9, Line 45, delete "that that" and insert -- that --, therefor.

Signed and Sealed this
Twenty-fourth Day of September, 2024

Katherine Kelly Vidal
*Director of the United States Patent and Trademark Office*